United States Patent
Takahashi et al.

(10) Patent No.: US 9,950,865 B2
(45) Date of Patent: Apr. 24, 2018

(54) CONVEYOR BELT

(71) Applicant: FORBO SIEGLING JAPAN LTD., Tokyo (JP)

(72) Inventors: Kae Takahashi, Shizuoka (JP); Kohei Zenitani, Shizuoka (JP)

(73) Assignee: FORBO SIEGLING JAPAN LTD., Tokyo (JP)

( * ) Notice: Subject to any disclaimer, the term of this patent is extended or adjusted under 35 U.S.C. 154(b) by 0 days.

(21) Appl. No.: 15/313,059

(22) PCT Filed: Apr. 15, 2015

(86) PCT No.: PCT/JP2015/061549
§ 371 (c)(1),
(2) Date: Nov. 21, 2016

(87) PCT Pub. No.: WO2015/186435
PCT Pub. Date: Dec. 10, 2015

(65) Prior Publication Data
US 2017/0190511 A1    Jul. 6, 2017

(30) Foreign Application Priority Data
Jun. 3, 2014 (JP) .................. 2014-114743

(51) Int. Cl.
| | | |
|---|---|---|
| *B65G 15/30* | (2006.01) | |
| *B65G 15/32* | (2006.01) | |
| *B65G 15/34* | (2006.01) | |
| *B65G 15/42* | (2006.01) | |
| *B29D 29/06* | (2006.01) | |

(52) U.S. Cl.
CPC ............ *B65G 15/42* (2013.01); *B29D 29/06* (2013.01); *B65G 15/30* (2013.01); *B65G 15/32* (2013.01); *B65G 15/34* (2013.01); *B65G 2201/06* (2013.01); *B65G 2812/02178* (2013.01)

(58) Field of Classification Search
None
See application file for complete search history.

(56) References Cited

U.S. PATENT DOCUMENTS 2,575,813 A * 11/1951 Hutchins ................ B65G 15/34
198/699.1
2,909,271 A * 10/1959 Taylor .................... B65G 15/42
198/690.2
5,840,636 A    11/1998 Mitsutsuka et al.

FOREIGN PATENT DOCUMENTS

| CN | 103350856 A | 10/2013 |
|---|---|---|
| FR | 1139936 | 7/1957 |
| JP | H03-259810 A | 11/1991 |

(Continued)

OTHER PUBLICATIONS

ISR of PCT/JP2015/061549 dated Jun. 30, 2015.
European Search Report dated Jan. 26, 2018 (7 pgs).

*Primary Examiner* — Kavel Singh
(74) *Attorney, Agent, or Firm* — Workman Nydegger

(57) ABSTRACT

The present invention allows the friction of the belt with the slide table to be abated as well as restrains dusts from occurring.
The conveyor belt 10 for carrying a transported article mounted on the surface thereof comprises: a belt main body 1; and a lower surface layer 3 to cover the lower surface of the belt main body 1, in which the lower surface layer 3 is provided with a projective surface 4b in which a plurality of projections 4 whose peak portions 4a are formed into a curved surface shape.

12 Claims, 4 Drawing Sheets

(56) References Cited

FOREIGN PATENT DOCUMENTS

| | | |
|---|---|---|
| JP | H058821 | 1/1993 |
| JP | H09-278137 A | 10/1997 |
| JP | 2001050351 A | 2/2001 |
| JP | 2003181917 A | 7/2003 |
| JP | 2004067303 A | 3/2004 |
| JP | 2009083357 | 4/2009 |
| JP | 2010195586 A | 9/2010 |
| NL | 1008954 C1 | 10/1999 |

* cited by examiner

CONVEYOR BELT

TECHNICAL FIELD

The present invention relates to a conveyor belt for carrying a transported article mounted on the surface of the conveyor belt.

BACKGROUND ART

Conventionally, such conveyor belt for carrying a transported article mounted on the surface thereof is known from, for example, Patent Document 1 below. The conveyor belt of this type has an upper layer made from a synthetic resin or the like, on which a transported article is mounted.

It is disclosed in, for example, Patent Document 2 below that a weaving pattern of a woven fabric is transcribed on the upper surface of the conveyor belt such that a shapely appearance is realized and high durability is secured.

CITATION LIST

Patent Literature

Patent Document 1: Japanese Patent Public Disclosure No. 2003-181917 (JP 2003-181917A)
Patent Document 2: Japanese Patent Public Disclosure No. 2010-195586 (JP2010-195586A)

SUMMARY OF INVENTION

Technical Problem

However, in a conveyor belt according to the prior arts, the material from which its main body is made is exposed on the lower surface of the belt. The lower surface of the belt is subjected to abutting onto the rollers to guide the conveyor belt to move on and acts as a contact surface through which the conveyor belt moves with sliding on the surface of the slide table, so that such lower surface in frictional contact with the rollers and the slide table when the conveyor belt runs, causes dusts to be produced vulnerably. Such production of dusts is unfavorable or undesirable in the case especially where processed foods are carried on the conveyor belt at food processing factories and as such.

An object of the present invention is to provide a conveyor belt to solve the above-mentioned problem so as to be able to abate its friction with the slide table and to prevent dusts from being produced during running of the conveyor belt.

Solution to Problem

The present invention relates to a conveyor belt for carrying a transported article mounted on the surface of the conveyor belt, comprising, a belt main body; and a lower surface layer to cover a lower surface of the belt main body, wherein the lower surface layer being provided with a projective surface in which a plurality of projections whose peak portions are formed into a curved surface shape.

In this case, the projective surface may be provided over the entire area of the lower surface of the belt main body. The projective surface may have the projections arranged with almost the same interval in the carriage direction. The projective surface is arranged such that the projections vertically arranged adjacent to each other with respect to the carriage direction are displaced from one another in the carriage direction. The conveyor belt may comprise an upper surface layer to cover the upper surface of the belt main body. The projective surface may be formed into a woven fabric-like or knitted fabric-like configuration.

Advantageous Effects of Invention

The conveyor belt embodied in the present invention allows its friction with the slide table to be abated and prevents dusts from being produced.

DESCRIPTION OF EMBODIMENTS

Hereinafter, the preferred embodiment for carrying out the present invention is described with reference to the accompanying drawings.

Figure 1:
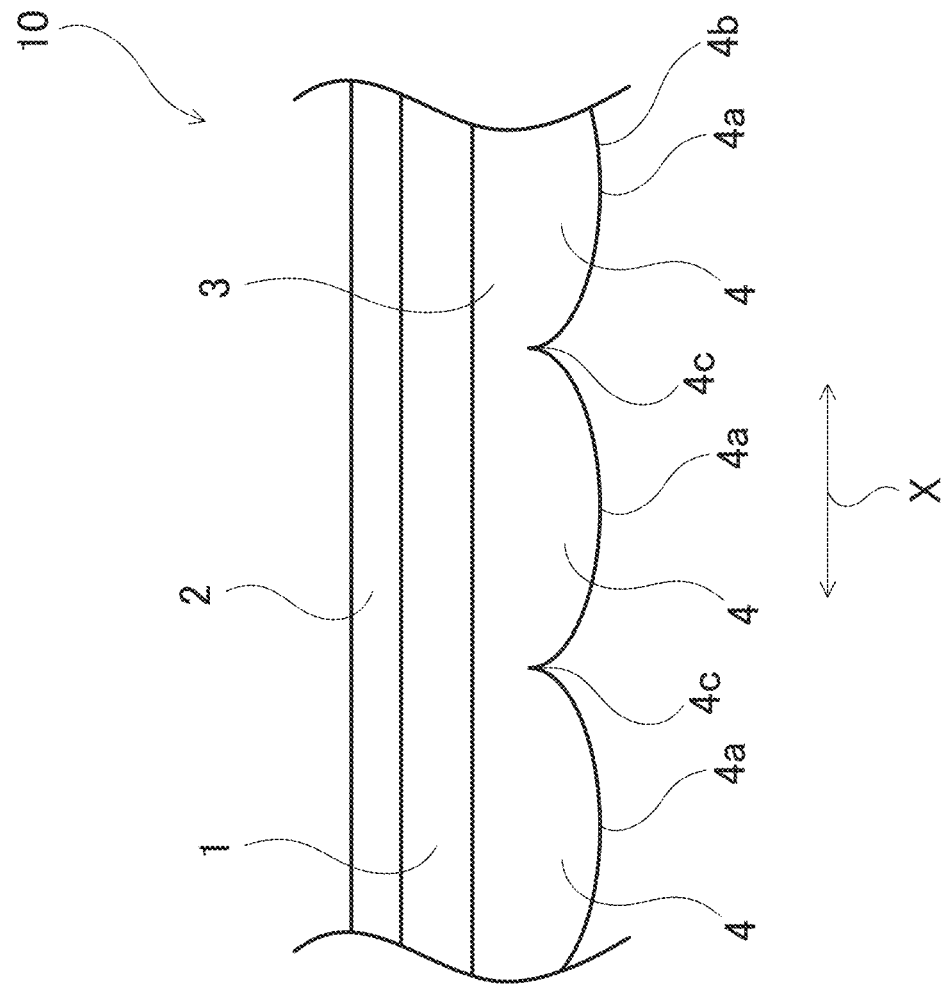
FIG. 1 is a cross-sectional view, showing schematically a conveyor belt embodied in the present invention.

FIG. 1 is a cross-sectional view, showing schematically the conveyor belt according to the present embodiment. The conveyor belt 10 is a belt used for a conveyor for continuously carrying transported articles placed on the surface of the belt while the belt is guided and fed by the rollers or the like.

The conveyor belt 10 is formed with a core member (belt main body) 1, an upper surface layer 2 and a lower surface layer 3 that are laminated one over another.

The core member 1 is the main structure of the conveyor belt 10. This core member 1 that is made of an aramid canvas, polyester canvas, polyamide sheet and the like is a sheet-like woven or knitted fabric prepared by weaving or knitting the filamentary yarns of such synthetic materials.

The upper surface layer 2 is a layer to cover the upper surface of the core member 1. This upper surface layer 2 is arranged such that a transported article can be mounted on its upper surface, and is formed in such a manner that the transported article is difficult to slide on the upper surface layer. The upper surface layer 2 is made from, for example, polyolefin, cottons, polyester, felt, synthetic rubber, polyester fibers bundle, polyamide, silicone, synthetic leather, polyurethane, PVC and so on. The upper surface layer 2 is adhered to the core member 1 along the configuration of its woven or knitted fabric, and the top surface thereof on which a transported article is mounted is formed into a smooth planar shape.

The lower surface layer 3 is a layer to cover the lower surface of the core member. The bottom surface of the lower surface layer 3 makes into contact with the carrier rollers for guiding the running conveyor belt 10 and into contact with the slide table. When the conveyor belt 10 runs on the slide surface of the slide table, the lower surface layer 3 moves in friction with the slide surface. The lower surface layer 3 is made from, for example, elastic materials as polyolefin, polyester, felt, synthetic rubber, polyester fibers bundle, polyamide, silicone, synthetic leather, polyurethane, PVC and the like. The lower surface layer 3 is arranged such that it is adhered to the core member 1 along the configuration of its woven or knitted fabric.

The lower surface layer 3 is provided with a projective surface 4b in which a plurality of projections 4, which the peak portion 4a and its vicinity are formed in curved surface shape, is arranged. The fact that the projections 4 of the projective surface 4b are formed in curved surface shape permits the frictional resistance applied to the conveyor belt 10, for example, when it moves on the slide surface of the slide table to be abated. Further, the places where dusts or the like are possibly suspended are limited to the valley portion 4c formed between the adjoining projections 4, so that the dusts attached on the lower surface layer 3 are deposited on such valley portion 4c.

Figure 2:
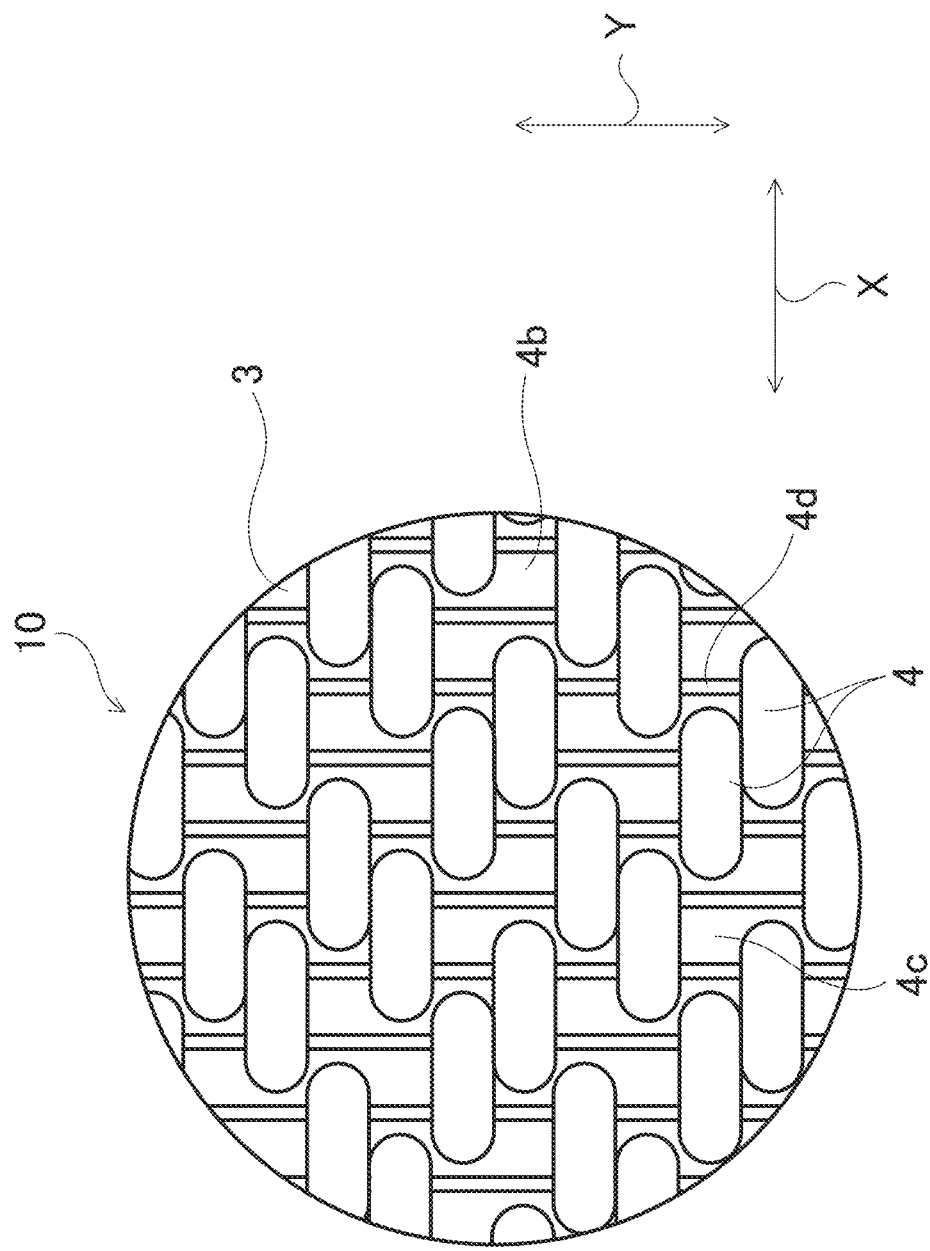
FIG. 2 is a plan view, showing schematically the lower surface of the conveyor belt, as seen from the underside thereof.

FIG. 2 is a plan view, showing the state where the lower surface of the conveyor belt is seen from below. FIG. 2 shows a part of the conveyor belt 10 partly surrounded with a circle.

The lower surface layer 3, as shown in FIG. 2, is formed into a woven fabric-like or knitted fabric-like configuration when the conveyor belt 10 is seen from the underside. In the drawing, a plurality of oval-shaped portions denote the projections 4, in which the interval between the oval-shaped portions forms the valley portion 4c. A plurality of vertical lines crossing with the projections 4 each assume a weft-like pattern of a woven or knitted fabric, which results from the fact that it is patterned according to the configuration of such woven or knitted fabric. The lower surface layer 3 is formed, for example, by pouring a resin into a female mold patterned from real woven or knitted fabric such as plain weave, twill weave and satin weave.

The pattern configured such that a plurality of projections 4 are disposed in the projective surface 4b is formed thick enough to make it unnecessary to correspond to the pattern according to the shape of the core member 1, more specifically, the sheet-like woven or knitted configuration of the core member 1. Accordingly, the pattern of the projective surface 4b can be selected as desired without considering the pattern according to the woven or knitted configuration of the core member 1.

The projective surface 4b is provided over the entire lower surface of the core member 1. This projective surface 4b is arranged such that the respective projections 4 are disposed with almost the same interval in the carriage direction X, more specifically, in the running direction of the conveyor belt 10 and the projections 4 disposed adjacently with each other in the widthwise direction Y, which is perpendicular to the carriage direction X, are displaced from one another with respect to the carriage direction X.

Figure 3:
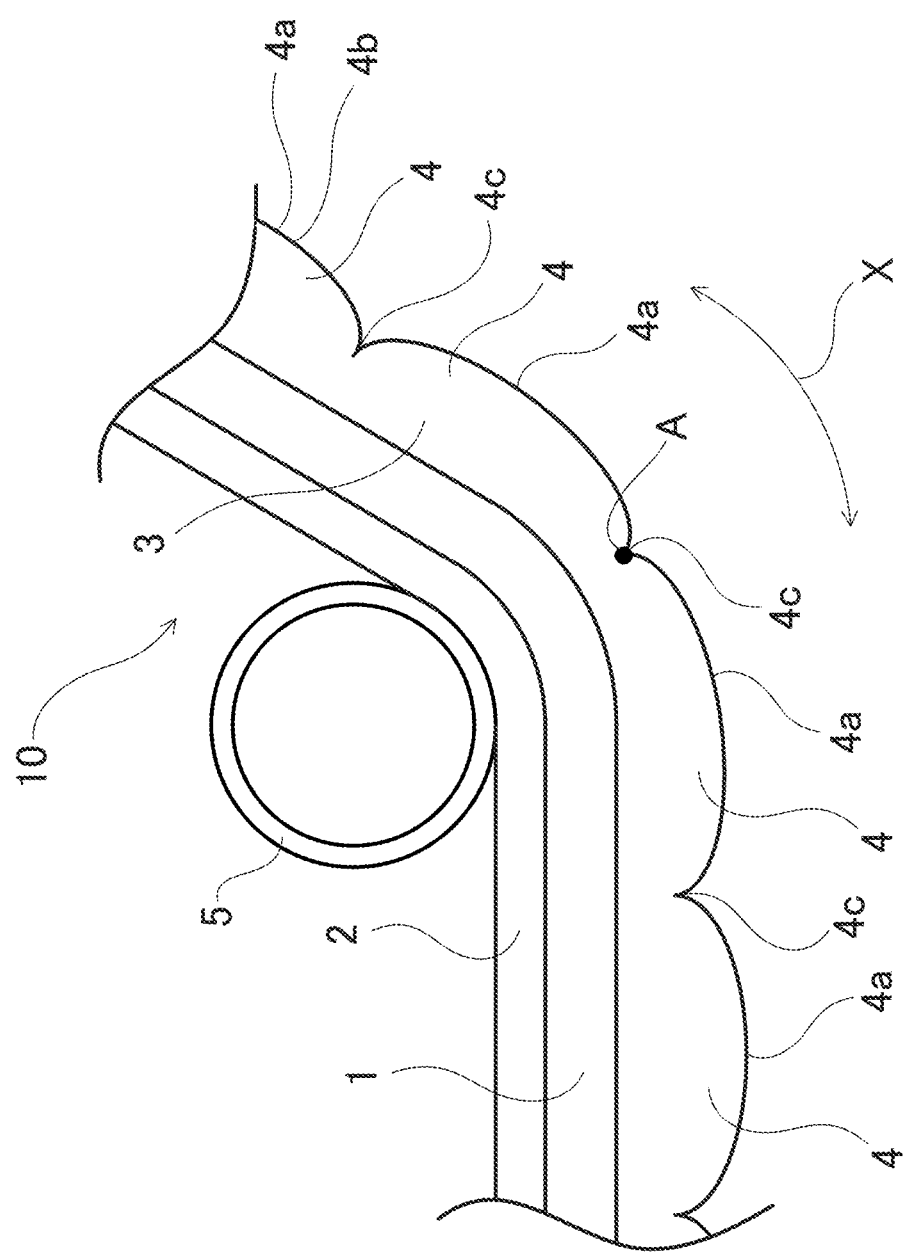
FIG. 3 is a cross-sectional view, showing schematically the state where the conveyor belt is curved upward.

FIG. 3 is a cross-sectional view, showing schematically the state where the conveyor belt 10 is curved upward.

The conveyor belt 10 is provided such that it can run while it is curved upward by pushing the guide roller 5 against the upper surface layer 2 from above at a section where no transported article is carried thereon. On account that the lower surface layer 3 is made of an elastic material, as shown in FIG. 3, it is bent about the upper surface layer 2 side and its traveling distance is elongated accordingly, as the result of which tensional force occurs in the carriage direction X so that, in particular, the vicinity of the valley portion 4c is stretched, thereby, the interval between two projections 4 being enlarged at the valley portion 4c shown with the point A of the lower surface layer 3. Thus, the dusts accumulated in the valley portion 4c of the lower surface layer 3 are removed from such portion 4c by having the valley portion 4c widened.

Then, explanation is given below on the comparative test of frictional coefficient among the conveyor belt 10 according to the present embodiment and a conveyor belt of the prior art.

The comparative test of frictional coefficient is carried out among the conveyor belt 10 of the present embodiment and a conveyor belt A and a conveyor belt B of the prior art.

The conveyor belt A is provided such that its core member itself is impregnated with a resin through impregnation treatment, while the conveyor belt B is provided such that a weaving pattern of a woven fabric is simply transcribed on the lower surface layer that covers the bottom surface of the core member.

The test of frictional coefficient is carried out under the following conditions.

Tester: Frictional coefficient measuring machine
    Surface to be measured: Lower surface of conveyor belt
        (Surface on which the driving force of the conveyor acts)
    Tension speed: 1000 mm/min (millimeters per minute)
    Object to be transported: Steel panel
    Weight of the Object: 5 kg (kilograms)

That is to say, the frictional coefficient derived from the friction arising between the respective belts and the steel panel moving the conveyor belt is measured with the frictional coefficient measuring machine with the lower surface of conveyor belt directed upward.

With the above test of frictional coefficient, it results that the frictional coefficient of the conveyor belt 10 of the present embodiment is 0.25 while the frictional coefficient of the conveyor belt A is 0.16 and the frictional coefficient of the conveyor belt B is 0.70. More specifically, in spite of the fact that the conveyor belt 10 is provided with the lower surface layer 3, its frictional coefficient is far lower than the conveyor belt B provided with the lower surface layer as well and is near to that of the conveyor belt A on which the impregnation treatment is performed. Therefore, the conveyor belt 10 is easy to slide on the slide surface of the slide table which has been drawback to the conveyor belt B of the prior art provided with the lower surface layer made from a resin.

In recent years, the conveyor belt A on which such impregnation treatment is performed has been set aside in the food processing industry because its lower surface made from a canvas or woven fabric is exposed so that remnants of the processed foods and as such are readily remained, in particular, in the mesh between the yarns so that such remnants propagate molds. The conveyor belt 10 of the present embodiment, in spite of the fact that it is provided with the lower surface layer 3 that the remnants are hard to be remained, has a frictional coefficient equivalent to that of the conveyor belt A on which the impregnation treatment is performed. Thus, the conveyor belt 10 can be applied to the conveyors whose belts slide on the slide surface of the slide table besides that intended for the conveyor belt A on which the impregnation treatment is performed.

Then, explanation is given below on the comparative test of ink staining between the conveyor belt 10 of the present embodiment and the conveyor belt A. The comparative test of ink staining is intended for comparing the degree to which an ink is stained into the conveyor belt 10 of the present embodiment and the conveyor belt A of the prior art.

In the comparative test of ink staining, the lower surface side of the conveyor belt is directed upward and an ink is dripped on it, and after leaving it for 24 hours, the degree of ink staining on the conveyor belt is checked.

Figure 4A:
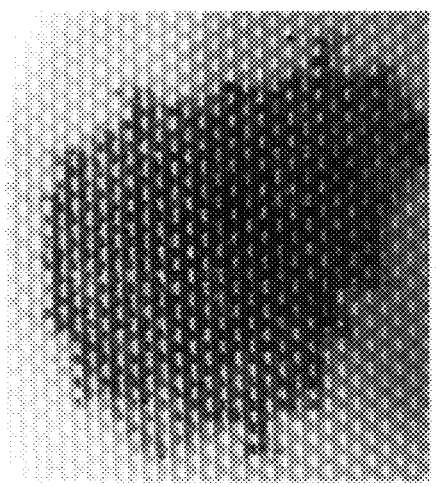
FIG. 4A includes views, showing the test results of conveyor belts stained with an ink.
Figure 4B:
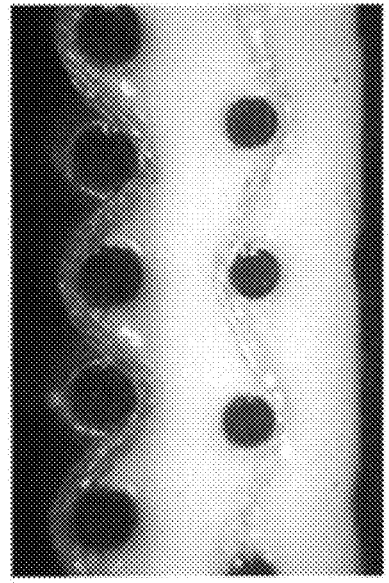
FIG. 4B includes views, showing the test results of conveyor belts stained with an ink.
Figure 4C:
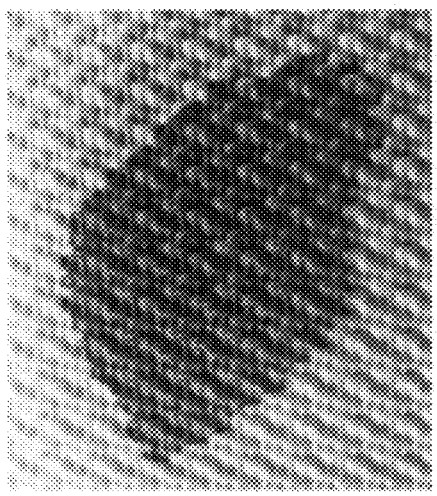
FIG. 4C includes views, showing the test results of conveyor belts stained with an ink.
Figure 4D:
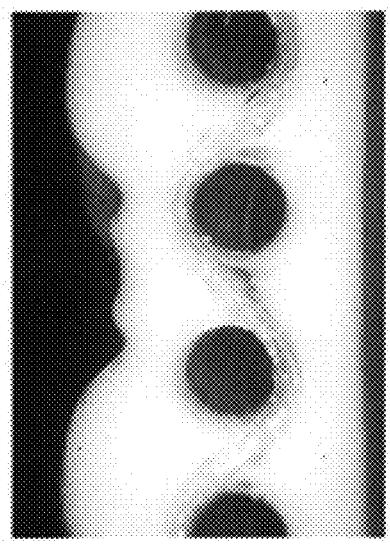
FIG. 4D includes views, showing the test results of conveyor belts stained with an ink.

FIG. 4A to FIG. 4D include views, showing the test results of conveyor belts stained with an ink. In these figures, FIG. 4A shows a plan view of the conveyor belt 10, FIG. 4B shows a cross-sectional view of the conveyor belt 10, FIG. 4C shows a plan view of the conveyor belt A, and FIG. 4D shows a cross-sectional view of the conveyor belt A.

The conveyor belt 10 is, as shown in FIG. 4B, hardly stained with an ink. On the other hand, the conveyor belt A is, as shown in FIG. 4D, stained with comparatively a large amount of ink.

According to the comparative test result of ink staining, the permeation of an ink into the belt is harder to occur on the conveyor belt 10 than the conveyor belt A. This is due to the fact that the conveyor belt 10 has a structure by which the core member 1 is not exposed by being provided with the lower surface layer 3. This structure allows direct damage on the core member 1 of the conveyor belt 10 caused by water, oils, chemical substances contained in transported articles and the like to be prevented as well as the stretching or contraction of the core member 1 caused by water, oils and chemical substances contained in such articles to be prevented. In this regard, performing the fusion and capping operation to fuse the upper surface layer 2 and the lower surface layer 3 at the widthwise fringe portion of the conveyor belt 10 so as to eliminate any cut fringe portion of the core member 1 allows direct damage on the core member 1 caused by water, oils and chemical substances and the like to be further prevented.

The conveyor belt 10 of the present embodiment is provided with the lower surface layer 3 having the projective surface 4b in which a plurality of projections 4, which have the peak portions 4a formed as a curved surface shape, are arranged. The fact that the lower surface of the core member 1 is covered with the lower surface layer 3 prevents dusts derived from the core member 1 provided on the lower side surface of the conveyor belt 10 from being produced. Further, when the conveyor belt 10 is bent upward, the valley portion 4c is widened, so that just bending the conveyor belt 10 upward permits dusts deposited on the lower surface layer 3 to be removed.

Moreover, as with the projective surface 4b of the lower surface layer 3, the peak portion 4a of the projections 4 is formed as a curved surface shape. Therefore, because the contact surface area of the conveyor belt with the slide surface of the slide table, for example, when it moves in friction with such slide surface is diminished, the frictional force arising between the conveyor belt and the slide surface is abated. Furthermore, because dusts are hard to be suspended due to its curved surface shape, the deposition of such dusts can be restricted.

REFERENCE SIGNS LIST 1 core member (belt main body)
2 upper surface layer
3 lower surface layer
4 projection
4a peak portion
4b projective surface
4c valley portion
4d weft
5 guide roller

The invention claimed is:

1. A conveyor belt for carrying a transported article mounted on a surface of the conveyor belt, comprising:
a belt main body;
an upper surface layer covering an upper surface of the belt main body wherein the upper surface layer comprises polyolefin, polyester, polyester fiber bundle, polyamide, silicone, polyurethane, or PVC; and
a lower surface layer covering a lower surface of the belt main body opposite the upper surface, wherein the lower surface layer comprises polyolefin, polyester, polyamide, silicone, polyurethane, or PVC;
wherein the lower surface layer is provided with a projective surface comprising a plurality of approximately oval-shaped projections arranged with peak portions formed into a curved surface shape and valley portions between the projections on the lower surface of the belt main body.

2. The conveyor belt according to claim 1, wherein the projective surface is provided over an entire area of the lower surface of the belt main body.

3. The conveyor belt according to claim 1, wherein the projective surface is configured such that the projections are arranged with almost the same interval among them in a carriage direction.

4. The conveyor belt according to claim 1, wherein the projective surface is configured such that the projections are vertically arranged adjacent to each other with respect to the carriage direction and are displaced from one another in the carriage direction.

5. The conveyor belt according to claim 1, wherein the projective surface is formed as a woven fabric-like or knitted fabric like configuration.

6. A conveyor belt for carrying a transported article mounted on a surface of the conveyor belt, comprising:
a belt main body;
an upper surface layer covering an upper surface of the belt main body wherein the upper surface layer comprises polyolefin, polyester, polyester fiber bundle, polyamide, silicone, polyurethane, or PVC; and
a lower surface layer covering a lower surface of the belt main body opposite the upper surface, wherein the lower surface layer comprises polyolefin, polyester, polyamide, silicone, polyurethane, or PVC;
wherein the lower surface layer is provided with a projective surface comprising a plurality of projections arranged with peak portions formed into a curved surface shape and valley portions between the projections on the lower surface of the belt main body.

7. The conveyor belt according to claim 6, wherein the projections are approximately oval-shaped.

8. The conveyor belt according to claim 6, wherein the conveyor belt further comprises valley portions between the projections on the lower surface of the belt main body.

9. The conveyor belt according to claim 6, wherein the projective surface is provided over an entire area of the lower surface of the belt main body.

10. The conveyor belt according to claim 6, wherein the projective surface is configured such that the projections are arranged with almost the same interval among them in a carriage direction.

11. The conveyor belt according to claim 6, wherein the projective surface is configured such that the projections are vertically arranged adjacent to each other with respect to the carriage direction and are displaced from one another in the carriage direction.

12. The conveyor belt according to claim 6, wherein the projective surface is formed as a woven fabric-like or knitted fabric like configuration.

\* \* \* \* \*